US008081624B2

(12) United States Patent
Buttles

(10) Patent No.: US 8,081,624 B2
(45) Date of Patent: Dec. 20, 2011

(54) COMMUNICATION DEVICES FOR NETWORK-HOPPING COMMUNICATIONS AND METHODS OF NETWORK-HOPPING COMMUNICATIONS

(75) Inventor: John W. Buttles, Idaho Falls, ID (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 483 days.

(21) Appl. No.: 12/370,854

(22) Filed: Feb. 13, 2009

(65) Prior Publication Data

US 2010/0208719 A1 Aug. 19, 2010

(51) Int. Cl.
*H04J 3/00* (2006.01)
(52) U.S. Cl. .................. 370/354; 370/235; 370/400
(58) Field of Classification Search .......... 370/230, 370/230.1, 231, 235, 345, 347–348, 389–390, 370/400–401, 432, 437, 441–444, 352–356
See application file for complete search history.

(56) References Cited

U.S. PATENT DOCUMENTS

| 5,978,679 A | 11/1999 | Agre | |
|---|---|---|---|
| 6,028,885 A | 2/2000 | Minarik et al. | |
| 6,965,585 B2 | 11/2005 | Grilli et al. | |
| 7,933,344 B2 * | 4/2011 | Hassan et al. | 375/260 |
| 2003/0169697 A1 * | 9/2003 | Suzuki et al. | 370/310 |
| 2005/0182847 A1 | 8/2005 | Jawad Pirzada et al. | |
| 2006/0193295 A1 * | 8/2006 | White et al. | 370/336 |
| 2006/0230187 A1 * | 10/2006 | Oz et al. | 709/253 |
| 2007/0079008 A1 * | 4/2007 | Leibovich et al. | 709/246 |
| 2008/0002657 A1 * | 1/2008 | Pisek et al. | 370/342 |
| 2008/0225812 A1 * | 9/2008 | Burgess et al. | 370/338 |
| 2009/0113444 A1 * | 4/2009 | Hackborn et al. | 719/312 |
| 2009/0168701 A1 * | 7/2009 | White et al. | 370/328 |
| 2010/0035553 A1 * | 2/2010 | Shinada et al. | 455/62 |
| 2010/0069074 A1 * | 3/2010 | Kodialam et al. | 455/450 |
| 2010/0069127 A1 * | 3/2010 | Fiennes | 455/574 |
| 2010/0111097 A1 * | 5/2010 | Karabinis et al. | 370/437 |
| 2010/0114887 A1 * | 5/2010 | Conway et al. | 707/737 |

FOREIGN PATENT DOCUMENTS

WO 00/24139 4/2000

OTHER PUBLICATIONS

Display Blog, "Paragon Wireless Hipi 2200: GSM, VoIP Dual-Mode Mobile Phone," WordPress.com, Oct. 4, 2006, 3 pages.
Valich, Theo, "Intel comms chip switches wireless protocols in the fly," Jun. 22, 2007, www.theinquirer.net, 3 pages.
Wikipedia, "Generic Access Network," en.wikipedia.org, Jul. 9, 2008, 4 pages.

* cited by examiner

*Primary Examiner* — Chi H. Pham
*Assistant Examiner* — Kevin Mew
(74) *Attorney, Agent, or Firm* — Michael J. Dobbs; Daniel D. Park; John T. Lucas

(57) ABSTRACT

Wireless communication devices include a software-defined radio coupled to processing circuitry. The processing circuitry is configured to execute computer programming code. Storage media is coupled to the processing circuitry and includes computer programming code configured to cause the processing circuitry to configure and reconfigure the software-defined radio to operate on each of a plurality of communication networks according to a selected sequence. Methods for communicating with a wireless device and methods of wireless network-hopping are also disclosed.

13 Claims, 5 Drawing Sheets

COMMUNICATION DEVICES FOR NETWORK-HOPPING COMMUNICATIONS AND METHODS OF NETWORK-HOPPING COMMUNICATIONS

GOVERNMENT RIGHTS STATEMENT

The United States Government has certain rights in this invention pursuant to Contract No. DE-AC07-05-ID 14517 between the United States Department of Energy and Battelle Energy Alliance, LLC.

TECHNICAL FIELD

The present invention relates generally to communication methods, devices and systems. More particularly, embodiments of the present invention relate to methods and devices for communicating using a plurality of communications networks.

BACKGROUND

Conventional wireless communications employ one of several different wireless technology standards (e.g., GSM, CDMA, WiFi, etc.) for exchanging voice and data information. Typically, modern devices employ encryption techniques that encode communication traffic between a wireless device and the cell site. Although encryption is fairly successful, eventually the technology standard employed to transmit the communications may be learned and the encryption may be compromised, or at least disrupted. For example, Global Security Solutions, located in Niagara Falls, Ontario, advertises a cellular telephone interceptor for monitoring and intercepting GSM and TDMA cellular traffic, including encrypted data.

Thus, although encrypted digital wireless communications are significantly more secure than historic wireless communications, the communications can be intercepted and decoded over time. Thus, it would be advantageous to provide devices and methods of communication capable of improving the security of wireless communications between wireless devices.

BRIEF SUMMARY

Various embodiments of the present invention comprise wireless communication devices configured to communicate on a plurality of wireless communication networks. In one or more embodiments, a wireless communication device may comprise a software-defined radio coupled to processing circuitry configured to execute computer programming code. Storage media may be coupled to the processing circuitry and may comprise computer programming code. In one or more embodiments, the programming code may be configured to cause the processing circuitry to configure and reconfigure the software-defined radio to operate using each of a plurality of communication networks according to a selected sequence.

Further embodiments of the invention comprise methods for communicating data. One or more embodiments of such methods may comprise communicating data to or from a wireless device for a predetermined amount of time using a first communication network. Subsequently, data may be communicated to or from the wireless device using a second, different communication network for another predetermined amount of time.

Still other embodiments comprise methods of wireless network-hopping. One or more embodiments of such methods may comprise establishing a connection between at least two communication devices on a plurality of wireless networks. Data may be transmitted between the at least two communication devices using a first wireless network for a predetermined amount of time. Subsequently, data may be transmitted between the at least two communication devices using a second wireless network for another predetermined amount of time.

DETAILED DESCRIPTION

In the following detailed description, circuits and functions may be shown in block diagram form in order not to obscure the present invention in unnecessary detail. Additionally, block definitions and partitioning of logic between various blocks as depicted is non-limiting, and comprise examples of only specific embodiments. It will be readily apparent to one of ordinary skill in the art that the present invention may be practiced in a variety of embodiments implementing numerous other partitioning solutions.

Also, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process is terminated when its acts are completed. A process may correspond to a method, a function, a procedure, a subroutine, a subprogram, etc. Furthermore, the methods disclosed herein may be implemented in hardware, software, firmware or combinations thereof.

In the following description, certain terminology is used to describe certain features of one or more embodiments of the invention. For instance, the term "network," which may also be referred to herein as a "wireless network," refers to a communication network using a particular communication technology and a particular communication provider. A communication technology refers to a communication standard or protocol used for conducting communications between two or more wireless devices. By way of example and not limitation, a communication technology may comprise wireless technologies such as GSM, CDMA, WiFi, WiMAX, LTE, CDMA2000, WCDMA, TD-SCDMA, WiBRO, etc. A communication provider comprises a provider of the communication technology to the user. By way of example and not limitation, some current providers of various communication technologies in the United States of America comprise AT&T™, SPRINT™, VERIZON WIRELESS™, T-MOBILE™, etc. Thus, using a particular network may refer, for example, to using GSM over AT&T™ or CDMA over VERIZON WIRELESS™, etc. As used herein, a change in at least one of the communication technology or the communication provider is considered a different network. These examples of communication technologies and communication providers are included for illustration only, and additional and/or alternative communication technologies and/or providers may be employed.

Figure 1:
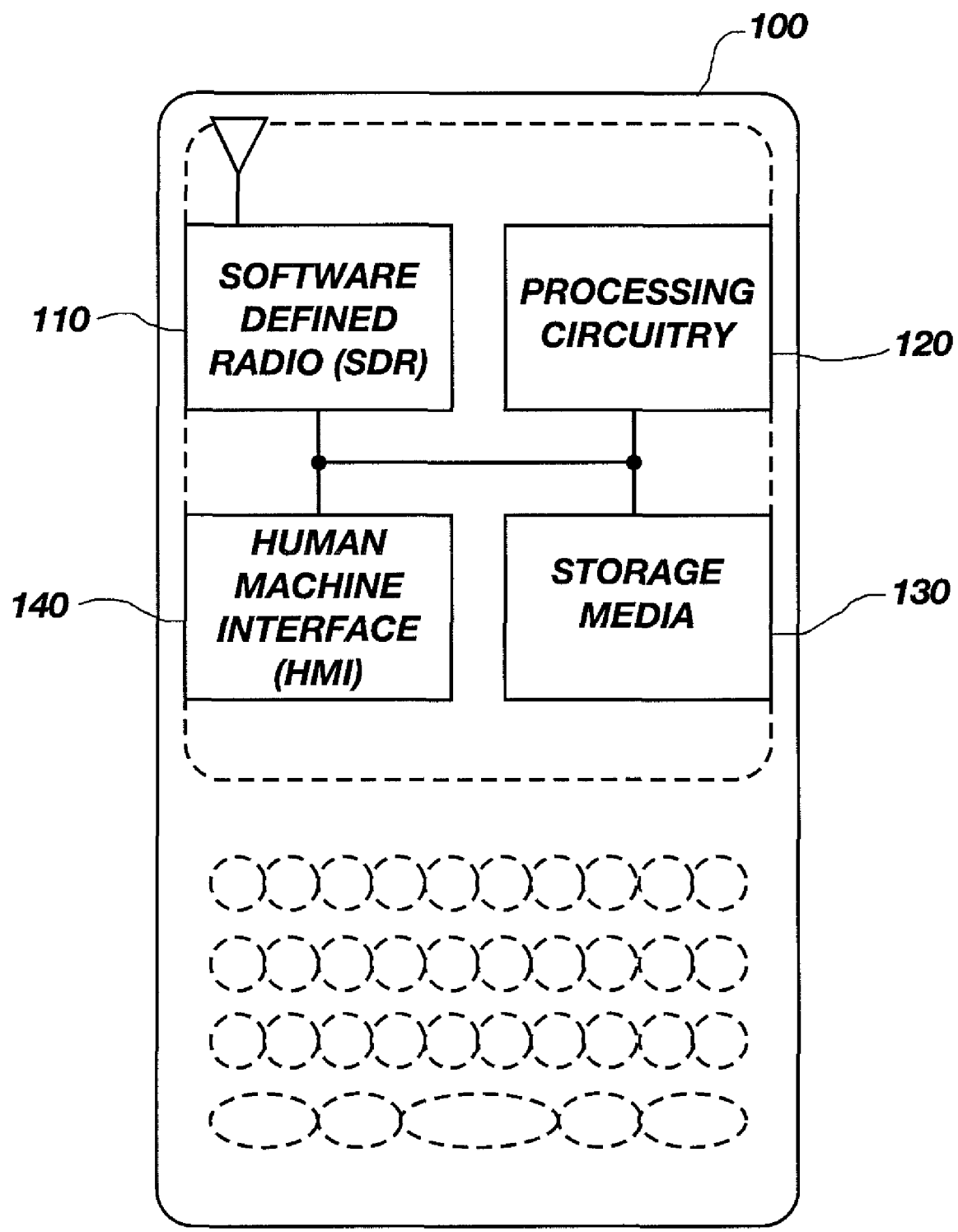
FIG. 1 is a block diagram of a configuration for a wireless communication device, according to at least one embodiment.

Various embodiments of the present invention are directed toward embodiments of a wireless device configured for secure wireless communications. FIG. 1 illustrates a configuration for a wireless device 100 according to at least one embodiment. A wireless device 100 may include a software-defined radio 110, processing circuitry 120 coupled to the software-defined radio, storage media 130 coupled to the processing circuitry, and a human-machine interface 140. Other arrangements within the scope of the invention are contemplated, including more, fewer and/or alternative components.

The software-defined radio 110 comprises wireless communication circuitry capable of being configured with software to perform the functions of a communication device configured to operate on a particular network. Using software, the software-defined radio 110 may be reconfigured on-the-fly to operate on any of a plurality of networks. By way of example and not limitation, the software-defined radio 110 may comprise the SB3000® chip by Sandbridge Technologies of Tarrytown, N.Y.

In at least some embodiments, the processing circuitry 120 may be arranged to obtain, process and/or send data, control data access and storage, issue commands, and control other desired operations. For example, in at least some embodiments, the processing circuitry 120 may be coupled to the software-defined radio 110 and arranged to configure and reconfigure the software-defined radio 110 to operate on each of a plurality of networks according to a set sequence. The processing circuitry 120 may comprise circuitry configured to implement desired programming provided by appropriate media in at least one embodiment. For example, the processing circuitry 120 may be implemented as one or more of a processor, a controller, a plurality of processors and/or other structure configured to execute executable instructions including, for example, software and/or firmware instructions, and/or hardware circuitry. Embodiments of processing circuitry 120 include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration. These examples of processing circuitry 120 are for illustration and other suitable configurations are also contemplated and may also be employed.

The storage media 130 is configured to store programming such as executable code or instructions (e.g., software, firmware, or a combination thereof), electronic data, databases, or other digital information and may include processor-usable media. By way of example and not limitation, the storage media 130 may include executable code, which may also be characterized as instructions, for configuring the software-defined radio 110 to operate on each of the wireless technologies for each provider. A storage medium may be any available media that can be accessed by a general purpose or special purpose computer. By way of example and not limitation, a storage medium may comprise one or more devices for storing data, including read-only memory (ROM), random access memory (RAM), magnetic disk storage mediums, optical storage mediums, flash memory devices, solid state hard disk, other computer-readable mediums for storing information, and combinations thereof.

Processor-usable media may be embodied in any computer program product(s) or article of manufacture(s) that can contain, store, or maintain computer programming code, data and/or digital information for use by, or in connection with, an instruction execution system including processing circuitry in the exemplary embodiment. For example, suitable processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information. At least some embodiments described herein may be implemented using programming code stored within appropriate storage media described above and configured to control appropriate processing circuitry.

The human-machine interface 140 comprises means for interaction between the wireless device 100 and a user. By way of example and not limitation, the human-machine interface 140 may comprise a display screen, a key pad, a touch screen, a microphone, a speaker, or combinations thereof, and may be coupled to the processing circuitry 120. The human-machine interface 140 may be integral to the wireless device 100, as depicted in FIG. 1, by the display screen and key pad shown in broken lines, or at least some portions of the human-machine interface 140 may be separate from, but electrically connected to the wireless device 100. By way of example and not limitation, a key pad or display screen may be coupled to the wireless device 100 wirelessly (e.g., BLUETOOTH®, WiFi) or by physical wires.

Figure 2:
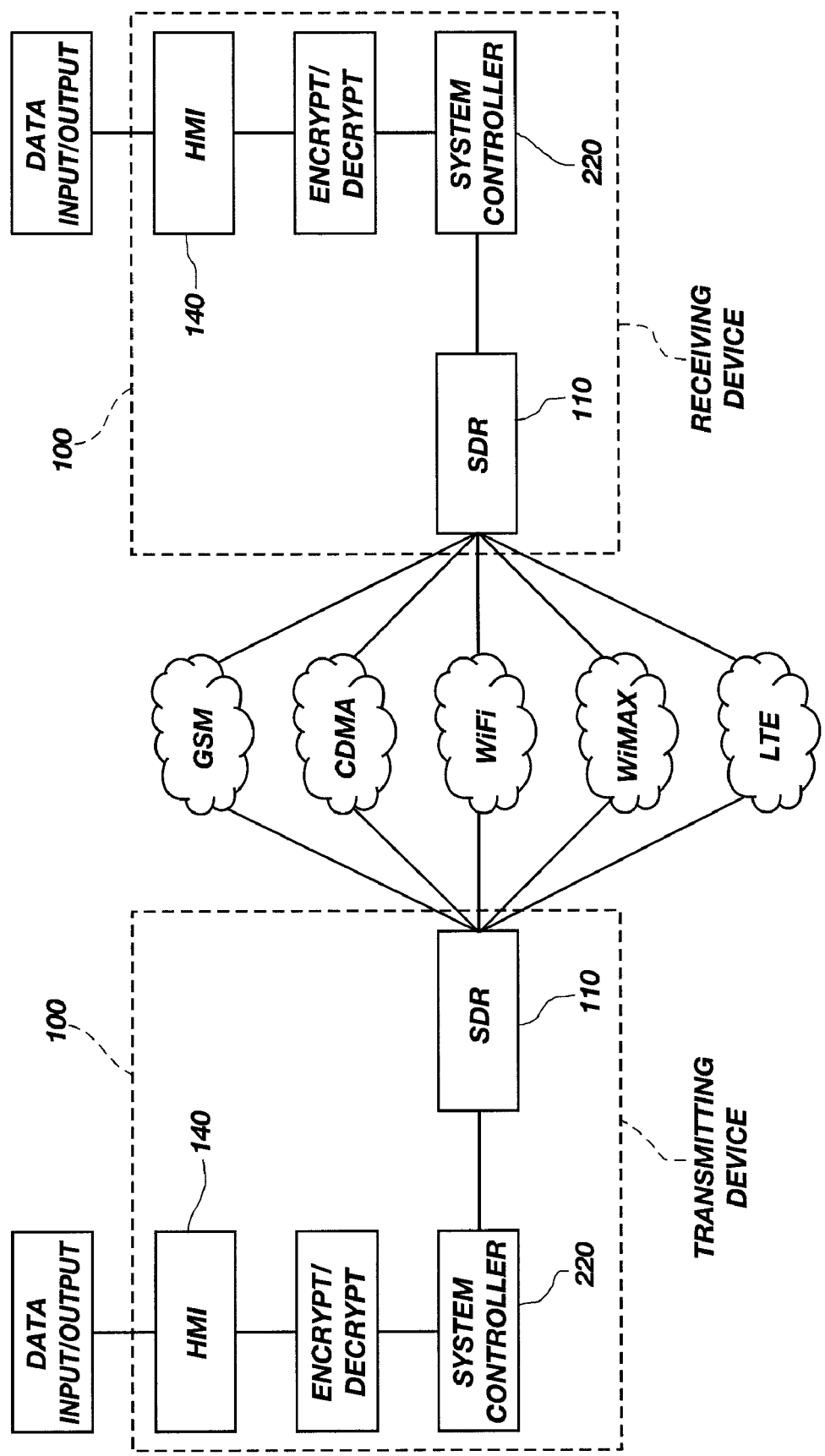
FIG. 2 is a flow diagram illustrating communication operation and components according to at least one embodiment.

Referring to FIG. 2, communication of data between a plurality of wireless devices 100 is shown and described according to at least one embodiment. Initially, a wireless device 100 is configured to communicate over a plurality of wireless networks. In the embodiment illustrated in FIG. 2, the processing circuitry 120 and storage media 130 are implemented as a system controller 220. The system controller 220 may be configured to implement communications over a plurality of networks. For example, the system controller 220 may implement programming comprising information relating to the plurality of technologies and providers comprising the plurality of networks with which the wireless device 100 may be configured to operate. Such programming may comprise one or more available network tables.

The available network table may include all of the network-specific information necessary for the wireless device 100 to authenticate and identify the wireless device 100 on each of the plurality of networks. By way of example and not limitation, the available network table may comprise any combination of one or more items of network-specific information including the Integrated Circuit Card ID (ICCID), the International Mobile Subscriber Identity (IMSI), authentication key (Ki), Local Area Identity (LAI), as well as other configuration details, network IDs, place call commands, timing requirements for sending "keep-alive" commands for remaining registered on each network, and any other specific commands necessary to allow the wireless device 100 to operate on each of the plurality of networks. For example, the available network table may comprise all the information typically found on a conventional subscriber identification module (SIM) card used for global system for mobile (GSM) enabled communication devices.

The system controller 220 may implement the programming relating to the available network table to configure the software-defined radio 110 to operate on each of the available networks and to communicate the necessary commands to establish a connection with each of the available networks. The system controller 220 may store a list of the available networks into an accepted available network table. In the non-limiting example illustrated in FIG. 2, a wireless device 100 may establish a connection with each of the networks comprising one or more providers employing wireless technologies including GSM, CDMA, WiFi, WiMAX and LTE.

In some embodiments, the system controller may comprise a wireless network-hopping (WNH) call table comprising a predefined and previously ordered listing of the networks that will be employed when the user's wireless device is communicating with another specific communication device. In other words, two wireless devices 100 configured to communicate with each other using a wireless network-hopping technique as described herein may be preprogrammed with at least one wireless network-hopping call table unique to communications between those two wireless devices 100 and defining the networks, order and timing of the network-hopping sequence when the two devices are communicating. The wireless network-hopping call table may be configured to include one sequence or several sequences, as well as a plurality of timing configurations. Indeed, different permutations of the wireless network-hopping call table may include multiple sequences and multiple variations of the multiple sequences. The wireless network-hopping call table is preloaded into the system controller 220 of both devices and is the same for both devices. Furthermore, the wireless network-hopping call table associated between a first wireless device and a second wireless device may differ from the wireless network-hopping call table associated between the first wireless device and a third wireless device.

Once the software-defined radio 110 has established a connection with each of the plurality of networks, a call may be established between one or more wireless devices 100. A user of a wireless device 100 may establish a wireless communication by inputting a unique identifier into the human-machine interface 140, which identifies the intended endpoint, such as a telephone number. If the communication is a wireless network-hopping communication, each wireless device 100 may have a plurality of telephone numbers or other identifiers associated therewith. For example, a wireless device 100 configured to operate on five different networks may comprise five different identifiers, such as telephone numbers, identifying the wireless device 100 as the endpoint over each unique network. Thus, a wireless device may be configured to include all the information for a wireless network-hopping communication for each contact, including all of the unique identifiers.

By way of example and not limitation, a first wireless device 100, such as the wireless device on the left side of FIG. 2 identified as the "transmitting device," may select a contact, such as the wireless device identified as the "receiving device" in FIG. 2, from a list of contacts stored on the wireless device 100. Selecting the contact may cause the system controller 220 to initiate conventional connection procedures over each of the networks in the wireless network-hopping call table associated with the receiving device. In particular, the system controller 220 may configure the software-defined radio 110 to communicate through each of the networks in the wireless network-hopping call table to attempt to initiate a call with the receiving device. For example, the software-defined radio 110 of the transmitting device may dial the number associated with the receiving device on the GSM network. If a connection is unsuccessful, then software-defined radio 110 may be reconfigured by commands from the system controller 220 to dial a different number associated with the receiving device on the CDMA network. Each network may be employed until a connection between the transmitting device and the receiving device is established. Once one of the available networks from the wireless network-hopping call table is successful in connecting the transmitting device and the receiving device, the wireless network-hopping call table associated with the two devices may be synchronized to identify which of the networks are actually available to the wireless devices 100. With the wireless network-hopping call tables synchronized, the system controllers 220 may reconfigure the respective software-defined radios 110 at least substantially simultaneously to switch to each of the remaining networks for establishing communications between the transmitting device and the receiving device on each of the plurality of networks.

As each wireless device 100 is establishing communications over the plurality of networks, the system controller 220 is configured to keep communications open through each previously connected network. Wireless networks conventionally comprise some form of "keep-alive" commands which are intended to keep channels open for a communication if the connection is temporarily lost. If communications over the network cease for a predetermined amount of time, the networks may be configured to disconnect the call to allow other users to use the network. The "keep-alive" commands may be sent by the software-defined radio 110 to each network as time expires for lack of communications. In at least some embodiments, the system controller 220 may include programming comprising a timer configured to determine how often to send a "keep-alive" command and configuration details for configuring the software-defined radio 110 to send the "keep-alive" command to each connected network to keep the wireless device 100 registered with the network.

Once the connection between the two or more wireless devices 100 is established for each of the plurality of networks, the wireless devices 100 may commence in transmitting data. Data may be input through the human-machine interface 140 by a user. By way of example and not limitation, data may be input in the form of audio, video, text messages, digital data such as a file transfer, or combinations thereof. In at least some embodiments, the wireless devices 100 may be configured to encrypt the input data with some form of data encryption. For example, the system controller 220 may be configured to implement some form of encryption. Encryption for wireless communications is known to those of ordinary skill in the art and any suitable encryption methods may be employed. Such encryption is optional and in some embodiments, data encryption may not be employed.

The input data is communicated to the system controller 220 and the system controller 220 communicates this input data to the software-defined radio 110. The system controller 220 also provides instructions to the software-defined radio 110, according to the wireless network-hopping call table, regarding which network the software-defined radio 110 should use to transmit the input data. The system controller 220 may reconfigure the software-defined radio 110 at intervals, in accordance with the wireless network-hopping call table, to switch between the available networks. By way of example and not limitation, a first portion of input data may be communicated using the software-defined radio 110 configured to transmit the data using a GSM network for a predefined interval or period of time. The system controller may then instruct the software-defined radio 110 to transmit additional portions of the input data using a WiFi network, for example, for another predefined period of time. In a similar manner, the system controller 220 may instruct the software-defined radio 110 to transmit data using each of the various available networks as defined by the wireless network-hopping call table.

The wireless device 100 on the receiving end of a data communication is synchronized with the transmitting wireless device 100, through the wireless network-hopping call table, such that the software-defined radio 110 of the receiving wireless device 100 is configured to receive the transmitted data over the same network used to transmit the data. The system controller 220 of the receiving device is coupled to the software-defined radio 110 and configured to instruct the software-defined radio 110 which network to use for receiving data. For example, if the transmitting wireless device 100 is configured to transmit the data using the GSM network for a predefined interval, then the receiving wireless device will be configured to receive data using the GSM network for the same predefined interval. When the transmitting wireless device 100 changes to another network, the receiving wireless device 100 will change to the same network at substantially the same time. In such a manner, data is streamed substantially continuously, even though the wireless network employed may be continuously changing.

The received data is communicated from the software-defined radio 110 to the system controller 220 which may process the received data into a suitable format for use by the human-machine interface 140 of the receiving device. Processing the received data into a suitable format may include decrypting the data in those embodiments in which the data has been encrypted. The data may then be output to a user, through the human-machine interface 140.

Figure 3:
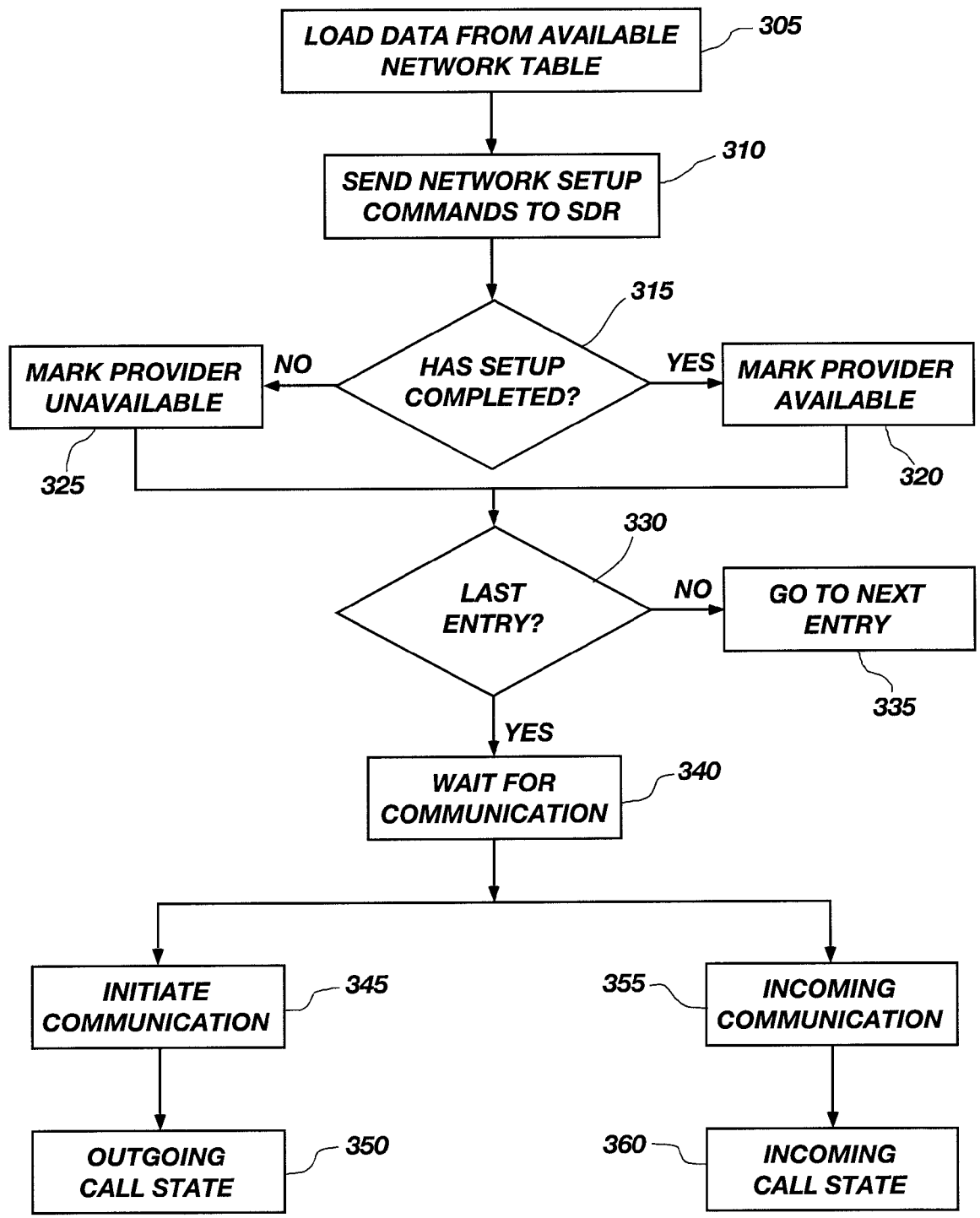
FIG. 3 is a flow diagram illustrating a method for establishing communications over a plurality of wireless networks according to at least one embodiment.
Figure 4:
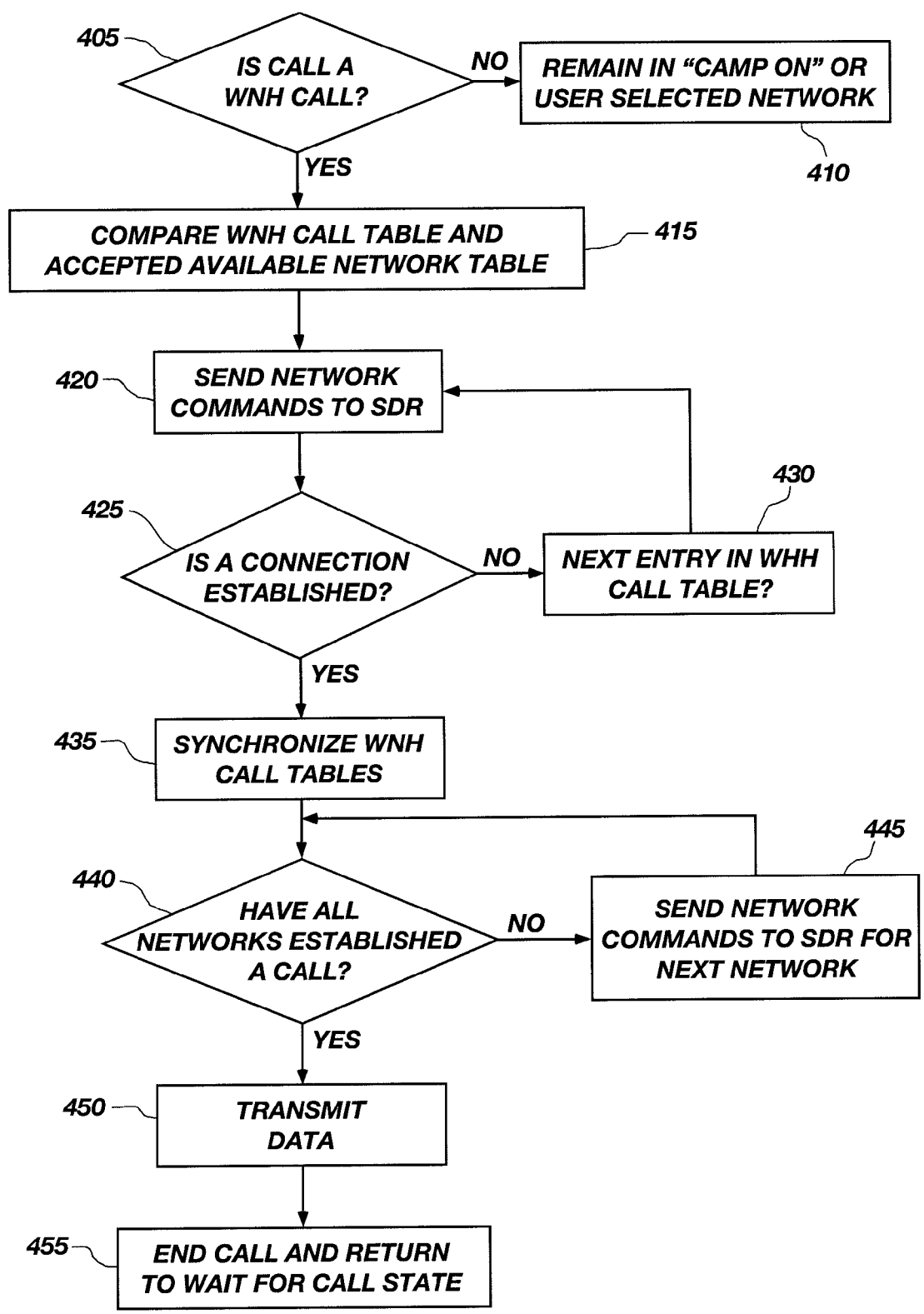
FIG. 4 is a flow diagram illustrating at least one embodiment of an outgoing call state for a wireless device.
Figure 5:
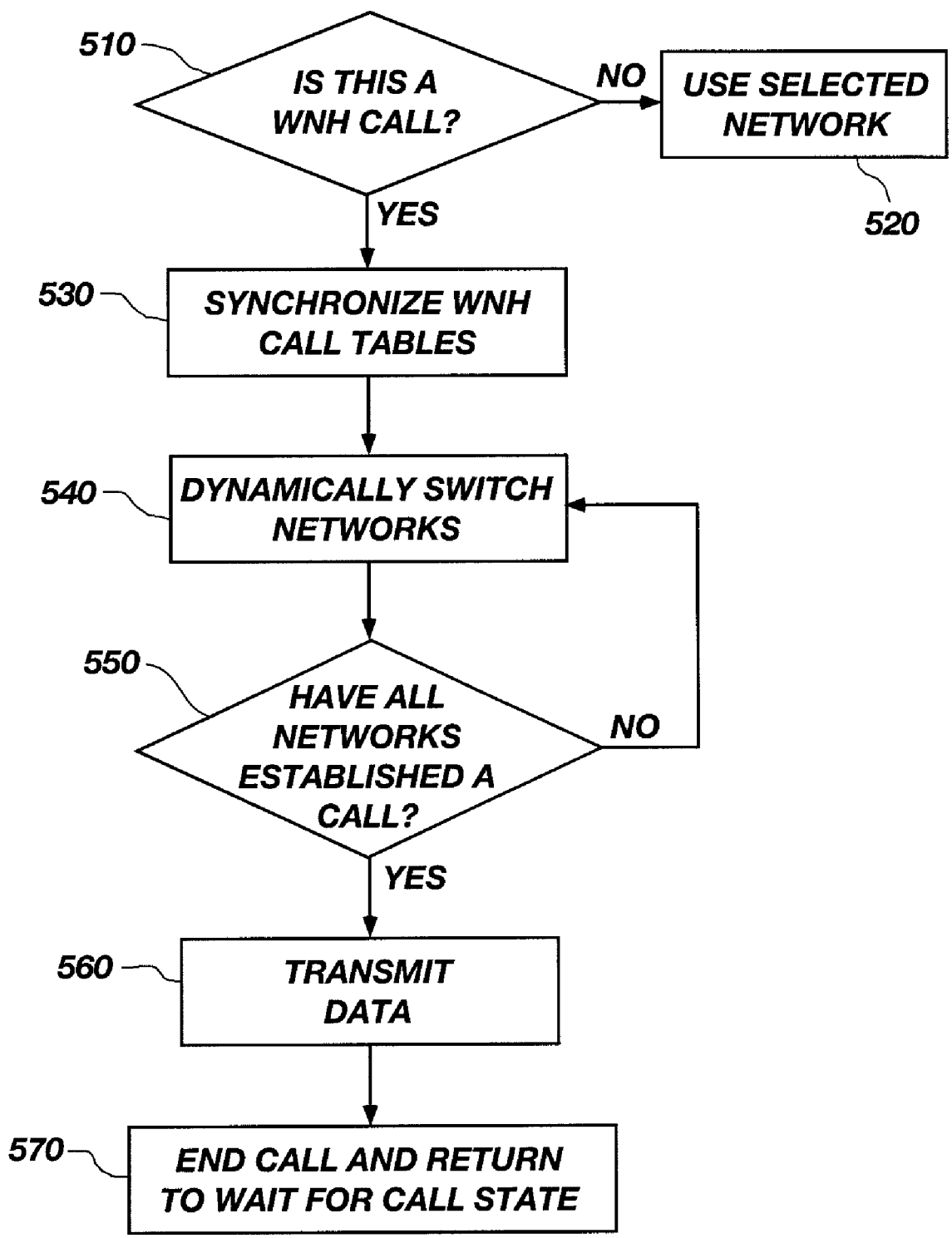
FIG. 5 is a flow diagram illustrating at least one embodiment of an incoming call state for a wireless device.

In use, many of the operations carried out by the wireless device 100 may be implemented by programming instructions in the form of software, hardware, or firmware, as well as combinations thereof. FIGS. 3-5 illustrate flow diagrams of at least some embodiments of programming which may be included in at least some embodiments of a wireless device 100. The embodiments are described with relation to FIGS. 3-5 with reference to the embodiments of a wireless device 100 described with relation to FIGS. 1 and 2. FIG. 3 is a flow diagram illustrating at least one embodiment of a method for establishing communications over a plurality of wireless networks. In at least some embodiments, such methods may be implemented by programming stored to a wireless device 100. Initially, all the data relating to the registration and communication details for a plurality of networks contained within the available network table is loaded into the accepted available network table 305. For the first network in the accepted available network table, the network setup commands and configuration details included in the accepted available network table are communicated to the software-defined radio 110 for configuring the software-defined radio 110 to communicate with the first network 310.

It may be determined by the wireless device 100 whether the software-defined radio 110 has successfully completed the setup and registration with the selected network 315. If setup and registration are successful, then the selected network is identified as "available" in the accepted available network table 320. If, however, setup and registration are unsuccessful for the selected network, then that selected network is identified as "unavailable" in the accepted available network table 325.

After a successful or unsuccessful registration for the selected network, it may be determined whether the selected network is the last entry in the accepted available network table 330. If the selected network is not the last entry in the accepted available network table, the setup and registration commands for the next network 335 are sent to the software-defined radio to attempt establishing communications with the next network in the accepted available network table 310.

If the selected network is the last entry in the accepted available network table, the wireless device 100 goes to a wait mode in which the wireless device 100 is ready to receive or make a wireless communication 340. In some embodiments, the wireless device 100 may comprise two wait modes, a wireless network-hopping wait mode and a camp on wait mode. In the wireless network-hopping mode, communications are sent to each network to keep the communication active. For example, programming in a wireless device 100 may include an accepted available network table timer comprising a timer and information regarding how often to send "keep-alive" commands for each network in order to keep the wireless device 100 registered on each available network. As the accepted available network table timer times out for each network, the "keep-alive" commands and configuration details are communicated to the software-defined radio, which transmits the commands to the network. In the camp on mode, the wireless device 100 remains configured for a specific network and the "keep-alive" commands and configuration details sent to the software-defined radio relate only to that specific network.

When the wireless device 100 is in the wait mode, a communication may be commenced from the wireless device 100 or a communication may be received by the wireless device 100. By way of example and not limitation, a communication with one or more other communication devices may be initiated by the wireless device 100 by entering a device identifier 345, such as a phone number, and the wireless device 100 may enter an outgoing call state 350. If an incoming communication, such as an incoming call, is received 355, the wireless device 100 may be configured to enter an incoming call state 360.

Turning to FIG. 4, a flow diagram is shown illustrating at least one embodiment of an outgoing call state for a wireless device 100. An outgoing communication may be initiated by entering a unique endpoint identifier, such as a phone number. In some embodiments, the unique endpoint identifier may comprise some name or other identification stored on the wireless device 100 and associated with all the information necessary for initiating a wireless network-hopping communication with each endpoint. For example, a wireless device 100 may comprise a list of contacts configured to receive and participate in a wireless network-hopping communication. All the relevant phone numbers and/or other identifiers, as well as the wireless network call table associated are stored for each of the contacts.

It may be determined, based on the endpoint identifier, whether or not the communication is a wireless network-hopping communication, also referred to herein as a wireless network hopping (WNH) call 405. In at least some embodiments, this may be determined based on the endpoint identifier selected. If the communication is not a wireless network-hopping communication, the wireless device 100 may remain in the camp-on mode and use the selected network of the camp-on mode, or the wireless device 100 may be configured to allow the user to select a particular network 410. When the communication is not a wireless network-hopping communication, the wireless device 100 will communicate over the same network for the entire time.

If the communication is a wireless network-hopping communication, the wireless device 100 may compare the wireless network-hopping call table to the accepted available network table 415. As described herein, the wireless network-hopping call table may be different for each endpoint a user may call. Thus, the programming of the wireless device 100 may compare the networks included in the wireless network-hopping call table with those of the accepted available network table to determine which of the networks in the wireless network-hopping call table are available at the time the call is initiated.

Starting with the first network in the wireless network-hopping call table, the wireless device 100 is configured to send the related setup commands, configuration details and place-call commands to the software-defined radio 420. The software-defined radio may then attempt to establish a connection with the endpoint over the first network 425. If no connection is established, the wireless device 100 may go to the next network in the wireless network-hopping call table 430, sending the related setup commands, configuration details and place call commands to the software-defined radio 420. For example, the software-defined radio of the wireless device 100 may be configured to use the first network to call the phone number associated with the endpoint on the first network. If no call is established (e.g., busy signal or voice mail), the software-defined radio of the wireless device 100 may be reconfigured to use the next network to call the phone number associated with the endpoint on the next network. By way of a more specific example and not by way of limitation, the wireless device 100 may use a first network (e.g., GSM on AT&T) to call a phone number (e.g., 555-555-5551) for another wireless device 100 associated with the same network (GSM on AT&T). If no call is established, the wireless device 100 may use a second network (e.g., GSM on T-Mobile) to call a phone number (e.g., 555-555-5552) for the other wireless device 100 associated with the second network (GSM on T-Mobile).

When a connection is established with the identified endpoint over one of the networks in the wireless network-hopping call table, the wireless network-hopping call tables of the two wireless devices 100 are synchronized 435. In other words, because the wireless network-hopping call table may include some networks that were not available to either or both of the wireless devices 100 participating in the communications, and because the wireless network-hopping call table may include various permutations and sequences, the wireless network-hopping call tables must be synchronized to reflect only those networks that are available to each wireless device 100 and to identify the hopping sequences and timing to be used for the current communications. This may be done using the first network through which communications were established.

When the tables are synchronized, communications may be established through the remaining networks of the wireless network-hopping call table. Programming may query whether all networks have established a connection 440 between the wireless devices 100. If not, the setup commands, configuration details and place call commands for the next network in the wireless network-hopping call table are communicated to the software-defined radio to establish a call 445. This step is repeated until all of the available networks have established communications between the two or more wireless devices 100. The wireless device 100 is configured to keep communications active over each network as communications are established over each additional network.

With communications established between the wireless devices 100 over a plurality of networks, data may be transmitted 450 between the wireless devices 100. The wireless devices 100 may include a wireless network-hopping call table entry timer associated with the wireless network-hopping call table for each device, which may comprise programming configured to determine how much time that the software-defined radio will remain in the configuration for a particular network during an established communication between the devices. Thus, as data is communicated between the wireless devices 100, the software-defined radios of each device will continuously be reconfigured for a different network such that the data is communicated over at least some of the networks over the course of the communications. When the call is ended, a transmission may be sent to each network indicating that the call is ended and the wireless devices 100 may return to the wait for call state 455.

Turning to FIG. 5, a flow diagram is shown illustrating at least one embodiment of an incoming call state for a wireless device 100. When a transmission is received initiating a communication between two or more wireless devices 100, the wireless device 100 receiving the transmission may determine whether the communication is a wireless network-hopping communication 510. This may be identified by the identifier, such as the phone number, of an initiating device. For example, if the device used to call the wireless device 100 is known to the wireless device 100 as comprising a wireless network-hopping device, then the communications may be set up as a wireless network-hopping communication. If the communication is not a wireless network-hopping communication, the wireless device 100 may remain in the selected network, in which the original transmission is received for the entire course of the communications 520.

If the communication is a wireless network-hopping communication, then the wireless device 100 may synchronize the wireless network-hopping call table with the wireless network-hopping call table of the initiating device 530. As described above, the wireless network-hopping call table is previously loaded into the wireless devices 100 and predefined as the wireless network-hopping call table for communications between the two respective devices before the wireless devices 100 are used for communications. With the wireless network-hopping call tables synchronized, the receiving wireless device 100 is configured to switch to the next network in the wireless network-hopping call table to await the call from the initiating device 540.

The wireless device 100 may determine whether all of the networks in the wireless network-hopping call table have been employed to establish communications between the wireless devices 550. If not, the receiving wireless device switches to the next network in the wireless network-hopping call table to await a call from the initiating wireless device. As communications are established on each of the networks, the wireless device is also sending the necessary "keep-alive" commands to those networks through which communications are already established.

With communications established between the wireless devices 100 over a plurality of networks, data may be transmitted 560 between the wireless devices 100. The wireless devices 100 may include a wireless network-hopping call table entry timer associated with the wireless network-hopping call table for each device, which may comprise programming configured to determine how much time that the software-defined radio of each wireless device 100 will remain configured for a particular network during ongoing communications between the devices. Thus, as data is communicated between the wireless devices 100, the software-defined radios of each device will continuously be reconfigured for a different network such that the data is communicated over at least some of the networks over the course of the communications. When the call is ended, a transmission may be sent to each network indicating that the call is ended and the wireless devices 100 may return to the wait for call state 570.

Additional embodiments of the present invention are directed toward methods of wireless communications. In at least some embodiments, methods of communicating with a wireless device may comprise transmitting data to or from a wireless device with a first selected communication network for a predetermined amount of time. A second, different communication network may then be selected and data may be transmitted to or from the wireless device with the second communication network for another predetermined amount of time. In at least some embodiments, the data may be encrypted prior to transmission on each of the plurality of communication networks. A connection may be established with the wireless device on the first communication network and the second communication network such that the connection with the wireless device occurs over all the communication networks at least substantially concurrently. Furthermore, a connection may be established with the wireless device on additional communication networks with the connection with the wireless device occurring at least substantially simultaneously.

In at least some additional embodiments, methods of wireless communications may include methods of wireless network-hopping. Embodiments of such methods may comprise establishing a connection between at least two communication devices on a plurality of wireless networks. Data may be transmitted between each of the communication devices using a first wireless network of the plurality of wireless networks for a set amount of time. Subsequently, data may be transmitted between the communication devices using another wireless network of the plurality of wireless networks for another set amount of time. Similarly, each wireless network of the plurality of wireless networks may be used for transmitting data between the communication devices.

In at least some embodiments, establishing a connection between the communication devices may include establishing communications between the at least two communication devices on a first network. For example, a software-defined radio of one communication device may be configured to establish a connection with the other communication device on a first wireless network. This may be carried out by configuring the software-defined radio of the one communication device to call a telephone number associated with the other communication device on a specific wireless network. The wireless network-hopping call table associated with communications between the two or more communication devices may be synchronized to identify each of the wireless networks that are available for use. With the wireless network-hopping call tables synchronized, connections may be established between the communication devices on each remaining wireless network of the plurality. In at least some embodiments, the subsequent connections may be established by reconfiguring the software-defined radio of the one communication device to call a telephone number or other identifier associated with the other communication device on each of the remaining wireless networks.

Although in the above embodiments, communications between wireless devices may be described in which the wireless devices communicate simultaneously over the same network, in at least some embodiments the wireless devices may communicate between differing networks. For example, a transmitting device may transmit data over a GSM network and the receiving device may receive the data over a CDMA network. The transmitting device may switch to a WiFi network for transmitting data to be received by the receiving device over a GSM network. As will be understood by those of ordinary skill in the art, a variety of configurations and patterns are possible and are contemplated.

Furthermore, although the above embodiments may describe communications between two or more wireless devices, embodiments of the present invention may be implemented with communications between one or more wireless devices and another communication device, such as a conventional land-line telephone. For example, a wireless device may employ a plurality of networks for establishing a call with a land-line telephone which may have only a single telephone number or a plurality of telephone numbers associated therewith. In at least some embodiments, the land-line telephone may use a conference calling feature to simultaneously communicate to the wireless device using each of the plurality of networks, even though the wireless device only communicates on one network at a time. In other embodiments, the other communication device may also be configured to hop between each network of the plurality of networks in the same sequence as the wireless device, as described above.

Thus, while certain embodiments have been described and shown in the accompanying drawings, such embodiments are merely illustrative and not restrictive of the scope of the invention, and this invention is not limited to the specific constructions and arrangements shown and described, since various other additions and modifications to, and deletions from, the described embodiments will be apparent to one of ordinary skill in the art. Thus, the scope of the invention is only limited by the literal language, and legal equivalents, of the claims which follow.

What is claimed is:

1. A wireless communication device, comprising:
    a software-defined radio;
    processing circuitry coupled to the software-defined radio;
    a storage media coupled to the processing circuitry and comprising a computer programming code configured to cause the processing circuitry to configure and reconfigure the software-defined radio to operate using each of a plurality of communication networks according to a selected sequence; and
    wherein the computer programming code comprises at least one wireless network-hopping call table configured to cause the processing circuitry to configure and reconfigure the software-defined radio to operate on at least some of the plurality of communication networks for the selected sequence and for at least one of a plurality of redefined intervals.

2. The wireless communication device of claim 1, wherein the computer programming code is further configured to cause the processing circuitry to configure and reconfigure the software-defined radio to operate using each of a plurality of communication technologies selected from the list consisting of GSM, CDMA, WiFi, WiMAX, LTE, CDMA2000, WCDMA, TD-SCDMA, and WiBRO.

3. The wireless communication device of claim 1, wherein the computer programming code is further configured to cause the processing circuitry to configure and reconfigure the software-defined radio to operate using each of a plurality of communication providers, each communication provider providing at least one communication technology.

4. The wireless communication device of claim 1, wherein the computer programming code is further configured to cause the processing circuitry to configure and reconfigure the software-defined radio to operate using at least one communication provider, the at least one communication provider providing a plurality of communication technologies.

5. The wireless communication device of claim 1, wherein the computer programming code is further configured to cause the processing circuitry to simultaneously maintain a plurality of active communications over the plurality of communication networks.

6. The wireless communication device of claim 1, wherein the computer programming code is further configured to cause the processing circuitry to encrypt data prior to transmitting the data.

7. A method of wireless network-hopping, comprising:
    establishing a connection between at least two communication devices on a plurality of wireless networks;
    transmitting data between the at least two communication devices using a first wireless network for a predetermined amount of time;
    subsequently transmitting data between the at least two communication devices using at least a second wireless network for another predetermined amount of time; and
    wherein establishing the connection between the at least two communication devices on the plurality of wireless networks con arises:
        establishing a connection between the at least two communication devices on the first wireless network;
        synchronizing a wireless network-hopping call table between the at least two communication devices; and
        establishing a connection between the at least two communication devices on each remaining wireless network of the plurality of wireless networks, 8. The method of darn 7, wherein establishing the connection between the at least two communication devices on the plurality of wireless networks comprises:
    configuring a software-defined radio of at least one communication device to establish a connection with at least one other communication device on the first wireless network; and
    reconfiguring the software-defined radio of the at least one communication device to establish a connection with the at least one other communication device on the second wireless network.

9. The method of claim 7, wherein establishing the connection between the at least two communication devices comprises establishing a connection between at least one wireless device and at least one other communication device.

10. The method of claim 7, wherein establishing the connection between the at least two communication devices on the plurality of wireless networks comprises maintaining the established connection between the at least two communication devices on each of the plurality of wireless networks.

11. The method of claim 10, wherein maintaining the established connection on each of the plurality of wireless networks comprises communicating keep-alive commands to each of the plurality of wireless networks.

12. The method of claim 7, wherein establishing the connection between the at least two communication devices on the plurality of wireless networks comprises establishing the connection between the at least two communication devices using at least one communication technology selected from the list of communication technologies comprising GSM, CDMA, WiFi, WiMAX, LTE, CDMA2000, WCDMA, TD-SCDMA, and WiBRO.

13. The method of claim 7, further comprising encrypting data prior to transmitting and subsequently transmitting.

* * * * *